(12) United States Patent
Sugimoto

(10) Patent No.: US 9,331,460 B2
(45) Date of Patent: May 3, 2016

(54) EXTERIOR PROTECTION TUBE FOR ELECTRIC WIRE

(71) Applicant: Yazaki Corporation, Minato-ku, Tokyo (JP)

(72) Inventor: Masahisa Sugimoto, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/687,261

(22) Filed: Apr. 15, 2015

(65) Prior Publication Data

US 2015/0222102 A1    Aug. 6, 2015

Related U.S. Application Data

(63) Continuation of application No. PCT/JP2013/076033, filed on Sep. 26, 2013.

(30) Foreign Application Priority Data

Oct. 15, 2012 (JP) ................................ 2012-228486

(51) Int. Cl.
*H02G 3/04* (2006.01)
*B60R 16/02* (2006.01)
(Continued)

(52) U.S. Cl.
CPC .......... *H02G 3/0406* (2013.01); *B60R 16/0215* (2013.01); *H02G 3/0462* (2013.01); *H02G 3/0481* (2013.01); *H02G 3/0616* (2013.01); *H02G 3/263* (2013.01)

(58) Field of Classification Search
CPC ..... H02G 3/04; H02G 3/0406; H02G 3/0462; H02G 3/0437; H02G 3/0468; H02G 3/06; H02G 3/32; H02G 3/34; B60R 16/0215; B60R 16/0207; B60R 16/02; F16L 57/00; F16B 2/10

USPC ........ 174/68.1, 68.3, 72 A, 72 R, 88 R, 70 C, 174/95, 40 CC; 248/49, 68.1, 74.1; 138/111, 138/118, 121; 180/65.1

See application file for complete search history.

(56) References Cited

U.S. PATENT DOCUMENTS 6,717,055 B2 *  4/2004  Kato ...................... H02G 3/32
                                                    174/72 A
7,381,897 B2 *  6/2008  Nishijima ............ H02G 11/006
                                                    174/68.3

(Continued)

FOREIGN PATENT DOCUMENTS

JP    2004-224156 A    8/2004
JP    2009-143326 A    7/2009

(Continued)

OTHER PUBLICATIONS

Apr. 30, 2015—(PCT) International Preliminary Report on Patentability—App PCT/JP2013/076033.

(Continued)

*Primary Examiner* — Angel R Estrada
(74) *Attorney, Agent, or Firm* — Banner & Witcoff, Ltd.

(57) ABSTRACT

An electric wire sheathing protection tube is formed from an insulation resin into a tubular shape, accommodates an electric wire in an interior thereof and is fixed to a predetermined position by a fixing member. Bendable portions which constitute bendable sections and non-bendable straight tube portions which constitute sections which are held into a straight tube shape are provided continuously and alternately along a longitudinal direction of the electric wire sheathing protection tube. A fixed attaching portion to which the fixing member is fixedly attached is provided integrally on at least one section in the non-bendable straight tube portions. A slidable attaching portion to which the fixing member is attached so as to slide in the longitudinal direction is provided integrally on at least one section in the non-bendable straight tube portions.

5 Claims, 10 Drawing Sheets

(51) Int. Cl.
*H02G 3/06* (2006.01)
*H02G 3/00* (2006.01)

(56) References Cited

U.S. PATENT DOCUMENTS

| | | | | |
|---|---|---|---|---|
| 7,692,095 | B2 * | 4/2010 | Katsumata | H02G 3/0691 174/72 A |
| 8,013,248 | B2 * | 9/2011 | Sakata | H02G 3/0691 174/68.1 |
| 8,020,812 | B2 | 9/2011 | Matsuno et al. | |
| 8,253,021 | B2 * | 8/2012 | Adachi | H02G 3/26 174/72 A |
| 8,847,073 | B2 * | 9/2014 | Tokunaga | H02G 3/30 174/68.1 |
| 2005/0011687 | A1 | 1/2005 | Yamaguchi et al. | |
| 2010/0148015 | A1 | 6/2010 | Matsuno et al. | |

FOREIGN PATENT DOCUMENTS

| | | |
|---|---|---|
| JP | 2010-133543 A | 6/2010 |
| JP | 2012-210101 A | 10/2012 |

OTHER PUBLICATIONS

Dec. 24, 2013—International Search Report—Intl App PCT/JP2013/076033.

* cited by examiner

EXTERIOR PROTECTION TUBE FOR ELECTRIC WIRE

CROSS REFERENCE TO RELATED APPLICATIONS

This application is a continuation of PCT application No. PCT/JP13/076033, which was filed on Sep. 26, 2013 based on Japanese Patent Application (No. 2012-228486) filed on Oct. 15, 2012, the contents of which are incorporated herein by reference.

BACKGROUND OF THE INVENTION

1. Field of the Invention

The present invention relates to an electric wire sheathing protection tube which accommodates an electric wire for protection.

2. Description of the Related Art

Conventionally, an electric wire sheathing protection tube which accommodates an electric wire is used for a wire harness which is routed on a vehicle body of a motor vehicle. Since such a wire harness is applied to a three-dimensional routing line, the wire harness has bendable tube portions which are portions which can be bent freely and non-bendable straight tube portions which are portions held in a straight tubular shape (in other words, portions which are difficult to be bent) (refer to Patent Literature 1).

Additionally, such an electric wire sheathing protection tube has fixing members for fixing itself which are attached thereto at a plurality of locations along a longitudinal direction thereof (refer to Patent Literature 2). These fixing members are fixed by stud bolts which are provided in predetermined positions on a vehicle so as to project therefrom, whereby the electric wire sheathing protection tube is fixed to a body of the vehicle along a predetermined routing line.

Patent Literature 1: JP-A-2009-143326
Patent Literature 2: JP-A-2010-133543

SUMMARY OF THE INVENTION

In the prior art, however, when the fixing members are attached to the electric wire sheathing protection tube, the positions where the fixing members are attached need to be determined by measuring distances from a reference position on the electric wire sheathing protection tube. In determining the attaching positions, it is considered that the positions where the fixing members are attached are marked on the electric wire sheathing protection tube. However, by a dimensional tolerance of the electric wire sheathing protection tube or the dimensional tolerance of the vehicle body which is an attaching target of the electric wire sheathing protections tube, in case the fixing members attached to the electric wire sheathing protection tube deviate from the fixing positions of the fixing members on the vehicle body where the stud bolts are placed in advance, the routing work becomes complex and troublesome.

The invention has been made in view of these situations, and an object of the invention is to provide an electric wire sheathing protection tube which can improve the working efficiency of the routing work.

With the view to achieving the object, an electric wire sheathing protection tube according to the invention is characterized by (1) to (5) below.

(1) An electric wire sheathing protection tube which is formed from an insulation resin into a tubular shape, which accommodates an electric wire in an interior thereof and which is fixed to a predetermined position by a fixing member, wherein bendable portions which constitute bendable sections and non-bendable straight tube portions which constitute sections which are held into a straight tube shape are provided continuously and alternately along a longitudinal direction of the electric wire sheathing protection tube, a fixed attaching portion to which the fixing member is fixedly attached is provided integrally on at least one section in the non-bendable straight tube portions, and a slidable attaching portion to which the fixing member is attached so as to slide in the longitudinal direction is provided integrally on at least one section in the non-bendable straight tube portions.

(2) The electric wire sheathing protection tube according to (1) above, wherein the fixed attaching portion has longitudinal movement restricting projecting portions which are provided on an outer circumferential surface of the non-bendable straight tube portion so as to project therefrom while extending in a circumferential direction of the non-bendable straight tube portion, and the longitudinal movement restricting projecting portions are provided in pair so as to be spaced apart from each other in the longitudinal direction by a distance which is equal to a width of the fixing member so that the fixing member is disposed between the longitudinal movement restricting projecting portions, and the slidable attaching portions have longitudinal movement permitting projecting portions which are provided on the outer circumferential surface of the non-bendable straight tube portion so as to project therefrom while extending in the circumferential direction, and the longitudinal movement permitting projecting portions are provided in pair so as to be spaced apart from each other by a distance over which the fixing member can slide in the longitudinal direction.

(3) The electric wire sheathing protection tube according to (2) above, wherein a plurality of longitudinal movement restricting projecting portions like the longitudinal movement restricting projecting portion are provided along the longitudinal direction so as to be spaced apart from each other by a distance which is equal to a width of the fixing member.

(4) The electric wire sheathing protection tube according to (2) or (3), wherein the fixed attaching portion and the slidable attaching portion have a circumferential movement restricting projecting portion which is provided on the outer circumferential surface of the non-bendable straight tube portion and projects therefrom while extending straight along the longitudinal direction so as to restrict a circumferential movement of the fixing member relative to the non-bendable straight tube portion.

(5) The electric wire sheathing protection tube according to anyone of (1) to (4), wherein at least one slidable attaching portion is provided on the non-bendable straight tube portion on which a plurality of the fixing members are provided in the non-bendable straight tube portions.

According to the electric wire sheathing protection tube of (1) above, even in the event that the non-bendable straight tube portion in one section is fixed at the plurality of locations by the fixing members, or even in the event that the electric wire sheathing protection tube is fixed at a plurality of locations in a plurality of sections by the fixing members, after the fixing member which is attached to the fixed attaching portion is fixed to the predetermined position, the fixing members which are attached to the slidable attaching portions slide to the predetermined positions to be fixed thereto, whereby the electric wire sheathing protection tube can be routed while absorbing the dimensional tolerances of the electric wire sheathing protection tube in fabrication and the attaching positions of the electric wire sheathing protection tube, thereby making it possible to improve the efficiency of the routing work.

According to the electric wire sheathing protection tube of (2) above, the attaching locations where the fixing members are attached to the electric wire sheathing protection tube can easily be identified by the longitudinal movement restricting projecting portions which are provided in pair and the longitudinal movement permitting projecting portions which are provided in pair.

According to the electric wire sheathing protection tube of (3) above, the portions whose thickness is increased by the longitudinal movement restricting projecting portion are provided continuously along the longitudinal direction, whereby it is possible to enhance the rigidity of the non-bendable straight tube portion.

According to the electric wire sheathing protection tube of (4) above, the fixing member can be prevented from rotating in the circumferential direction of the non-bendable straight tube portion by the circumferential movement restricting projecting portions, and therefore, not only can the looseness of the fixing member relative to the non-bendable straight tube portion be restricted, but also the circumferential movement restricting projecting portions can constitute a reference for positioning the fixing member when the fixing member is attached to the non-bendable straight tube portion.

According to the electric wire sheathing protection tube of (5) above, when the plurality of fixing members are attached to the non-bendable straight tube portion in one section, since the slidable attaching portions are inevitably provided in the section, it is possible to route the electric wire sheathing protection tube by absorbing the dimensional tolerances of the electric wire sheathing protection tube in fabrication and the attaching positions of the electric wire sheathing protection tube in an ensured fashion.

BRIEF DESCRIPTION OF DRAWING

FIGS. 4A and 4B are front views of a fixing member shown in FIG. 1, of which FIG. 4A shows a state in which a movable holding portion and a fixed holding portion are not yet brought into engagement with each other, and FIG. 4B shows a state in which the movable holding portion and the fixed holding portion are in engagement.

FIGS. 5A and 5B are perspective views of the fixing member shown in FIG. 1, of which FIG. 5A is a view of the fixing member as seen from thereabove, and FIG. 5B is a view of the fixing member as seen from therebelow.

DETAILED DESCRIPTION OF THE EXEMPLARY EMBODIMENTS

Hereinafter, referring to FIGS. 1 to 7C, a preferred embodiment of an electric wire sheathing protection tube according to the invention will be described.

Figure 1:
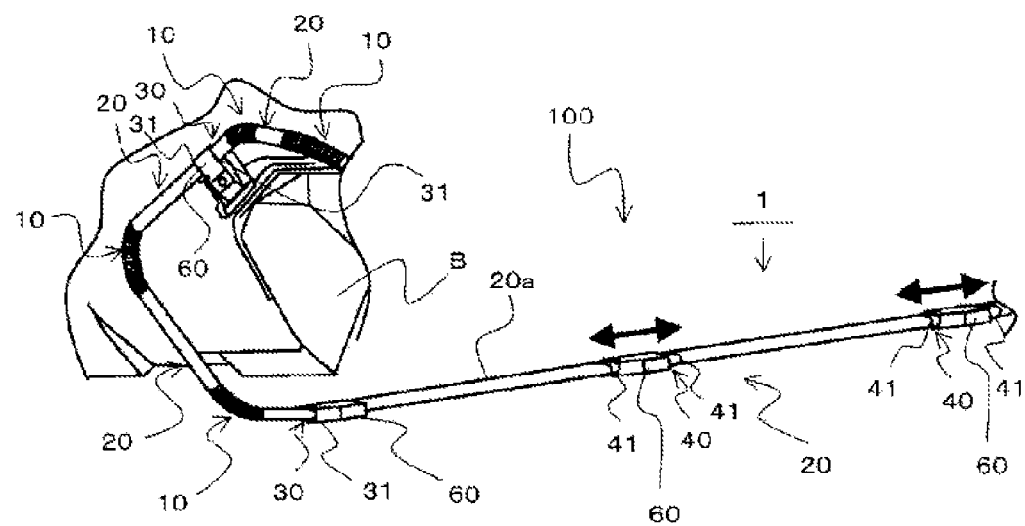
FIG. 1 is a view showing a state in which a wire harness using an electric wire sheathing protection tube according to an embodiment is routed on a vehicle body.
Figure 2:
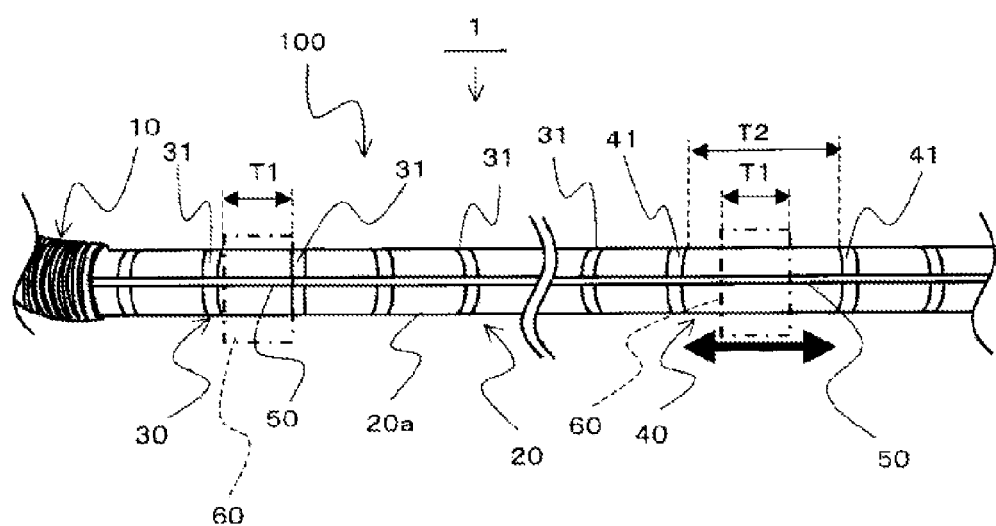
FIG. 2 is an enlarged view of a main part of the electric wire sheathing protection tube shown in FIG. 1.
Figure 3:
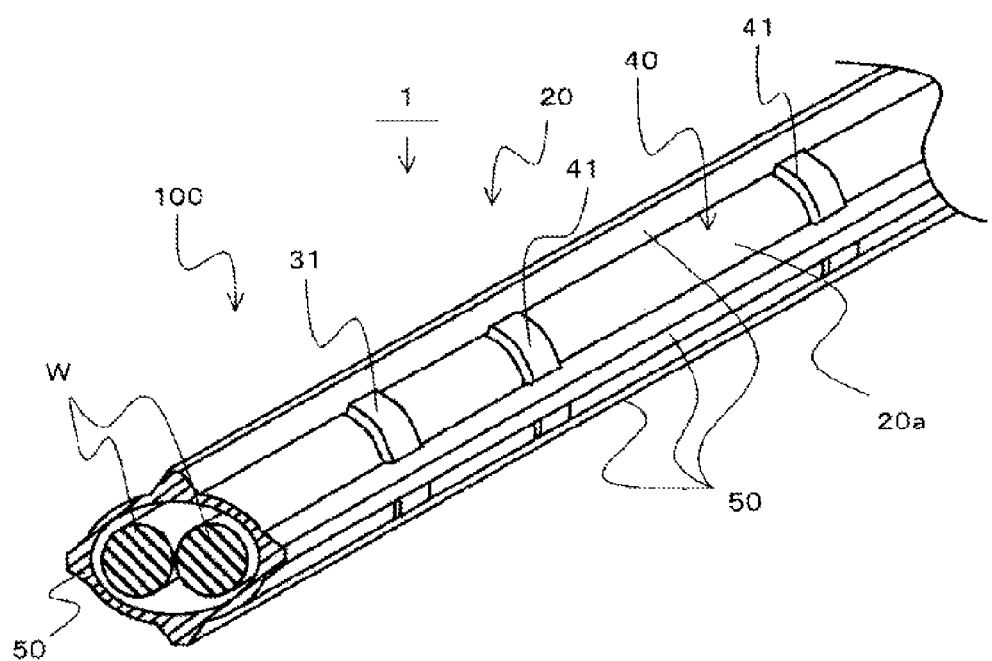
FIG. 3 is a perspective view showing part of the wire harness shown in FIG. 1 and a section thereof.
Figure 4A:
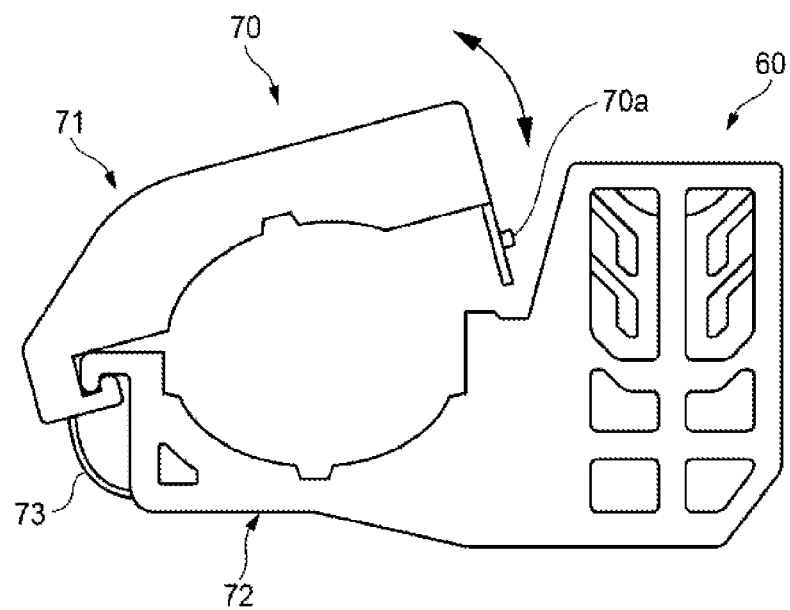
Figure 4B:
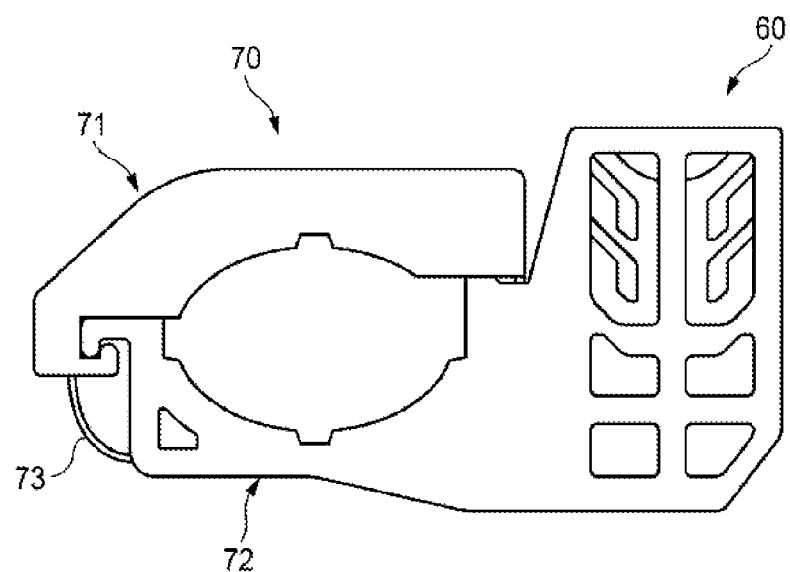
Figure 5A:
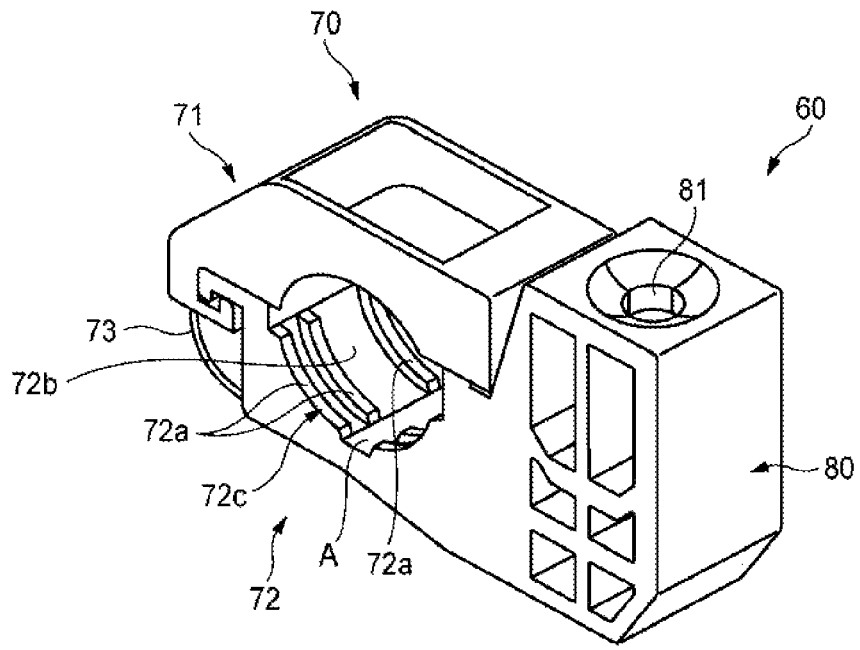
Figure 5B:
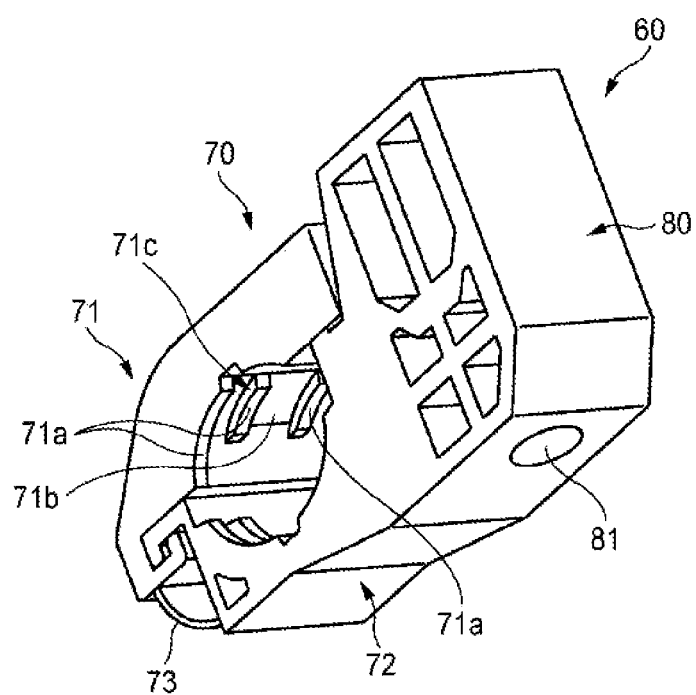
Figure 6:
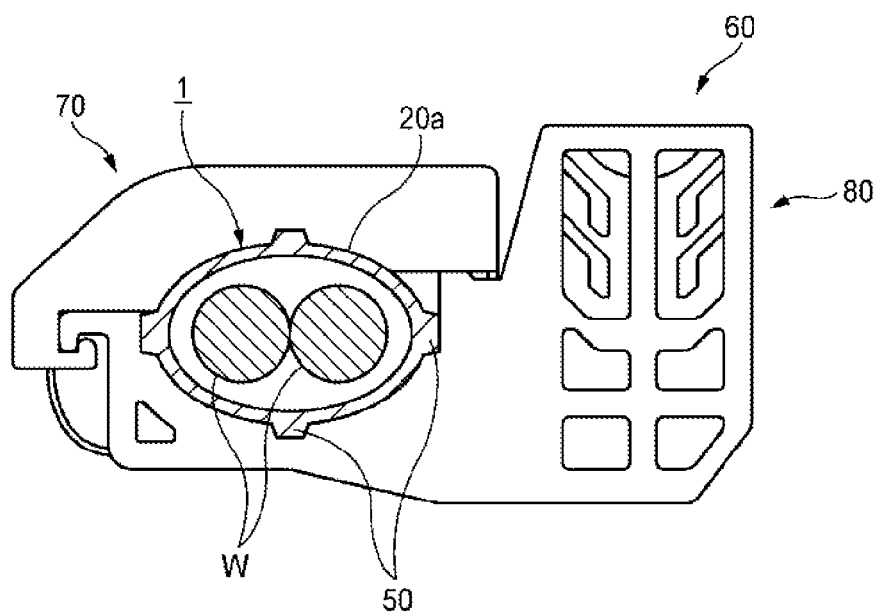
FIG. 6 is a view showing a state in which the fixing member is attached to the electric wire sheathing protection tube.

FIG. 1 is a view showing a state in which a wire harness 100 using an electric wire sheathing protection tube 1 according to an embodiment is routed on a body B of a vehicle. FIG. 2 is an enlarged view of a main part of the electric wire sheathing protection tube 1 shown in FIG. 1. FIG. 3 is a perspective view showing part of the wire harness 100 shown in FIG. 1 and a section thereof. FIG. 4 shows front views of the fixing member 60 shown in FIG. 1, of which FIG. 4A shows a state in which a movable holding portion 71 and a fixed holding portion 72 are not yet brought into engagement with each other, and FIG. 4B shows a state in which the movable holding portion 71 and the fixed holding portion 72 are in engagement. FIGS. 5A and 5B are perspective views of the fixing member 60 shown in FIG. 1, of which FIG. 5A is a view of the fixing member 60 as seen from thereabove, and FIG. 5B is a view of the fixing member 60 as seen from therebelow. FIG. 6 is a view showing a state in which the fixing member 60 is attached to the electric wire sheathing protection tube 1. In FIG. 6, the wire harness 100 is shown in section.

An electric wire sheathing protection tube 1 of this embodiment is such as to be used for a so-called wire harness 100 which is routed on a body B of a motor vehicle and is a member which accommodates an electric wire W for protection. This electric wire sheathing protection tube 1 is a tubular member of an insulation resin which accommodates an electric wire W in an interior thereof. In the electric wire sheathing protection tube 1, bendable portions 10 which constitute bendable sections and non-bendable straight tube portions 20 which constitute sections which are held in a straight tube-like shape are provided continuously and alternately along a longitudinal direction thereof. The electric wire sheathing protection tube 1 is fixed to predetermined fixing positions on the body B by fixing members 60.

In the electric wire sheathing protection tube 1 of this embodiment, as shown in FIG. 3, two electric wires W corresponding to two systems, plus and negative, are bundled together for accommodation in an interior of a so-called flat tube having an elliptic sectional outline. The number of electric wires W to be accommodated in the electric wire sheathing protection tube 1 is not limited two, and hence, accommodating any number of electric wires W in the tube will impose no problem in case one or more wires W are accommodated. In this embodiment, the electric wires W are high-voltage electric wires which connect a battery (not shown) and an inverter (not shown), and a shielding function is provided to the electric wire side.

In addition, as shown in FIG. 1, the electric wire sheathing protection tube 1 has bendable portions 10 which are provided in four sections and non-bendable straight tube portions 20 which are provided in four sections.

The bendable portion 10 has a so-called corrugated shape and constitutes a portion which is bent according to a routing line of the wire harness 100.

The bendable portion 10 may be fixed to the body B with a fixing member, not shown, which is separate from the fixing member 60.

Additionally, the shape of the bendable portion 10 is not limited to the corrugated shape, and hence, the bendable portion 10 may be of any other shapes as long as the bendable portion 10 can be bent. For example, the bendable portion 10 may be bent by adjusting the thickness of the tube.

The non-bendable straight tube portion 20 is a portion which is provided for a straight routing line of the routing line along which the wire harness 100 is routed. In particular, in the wire harness 100 which is routed on the body B, there is a tendency that a non-bendable straight tube portion 20 which is routed under a floor of the vehicle is formed relatively long. Because of this, a plurality of fixing members 60 are attached to the non-bendable straight tube portion 20.

In the electric wire sheathing protection tube 1 which has the bendable portions 10 and the non-bendable straight tube portions 20 which are configured in the way described above, a fixed attaching portion 30 where a fixing member 60 is attached fixedly is provided integrally on an outer surface of at least one of the non-bendable straight tube portions 20 which are provided in the four sections. Additionally, in the electric wire sheathing protection tube 1, a slidable attaching portion 40 where a fixing member 60 is attached slidably is provided integrally on an outer surface of at least one of the non-bendable straight tube portions 20 where the fixed attaching portion 30 is provided.

In the electric wire sheathing protection tube 1 of this embodiment, fixing members 60 can be attached to the non-bendable straight tube portions 20 in the two sections. More specifically, in the electric wire sheathing protection tube 1, a fixed attaching portion 30 is provided in one location on one of the non-bendable straight tube portions 20 in the two sections to which the fixing members 60 are attached. Additionally, a fixed attaching portion 30 is provided in one location and slidable attaching portions 40 are provided in two locations on the other long non-bendable straight tube portion 20.

Here, the fixed attaching portion 30 will specifically be described.

The fixed attaching portion 30 has a longitudinal movement restricting projecting portion 31 and a circumferential movement restricting projecting portion 50.

The longitudinal movement restricting projecting portion 31 is provided on an outer circumferential surface 20*a* of the non-bendable straight tube portion 20 so as to project therefrom along a circumferential direction of the outer circumferential surface 20*a*. Additionally, longitudinal movement restricting projecting portions 31 are provided in pair along a longitudinal direction of the non-bendable straight tube portion 20 in such a way as to be spaced apart from each other by a distance equal to a width of the fixing member 60 so that the fixing member 60 is disposed between the longitudinal movement restricting projecting portions 31 so as to be fixed in place therebetween.

More specifically, as shown in FIG. 2, the distance between the longitudinal movement restricting projecting portions 31 which are provided in pair is set to be equal to a width T1 of a holding portion 70, which will be described later, of the fixing member 60.

Additionally, each longitudinal movement restricting projecting portion 31 is formed to extend along the direction of an outer circumference of the non-bendable straight tube portion 20 into a ring-like shape. Namely, a surface which is brought into contact with the fixing member 60 is set as large as possible. This not only enables the fixing member 60 to be fixed stably by the longitudinal movement restricting projecting portions 31 but also increase the rigidity of the longitudinal movement restricting projecting portion 31 itself.

The circumferential movement restricting projecting portion 50 is provided on the outer circumferential surface 20*a* of the non-bendable straight tube portion 20 in such a way as to project therefrom while extending straight along the longitudinal direction of the non-bendable straight tube portion 20 to thereby restrict the fixing member 60 from moving in the circumferential direction relative to the non-bendable straight tube portion 20. In this embodiment, circumferential movement restricting projecting portions 50 are provided in four locations at equal intervals in the direction of the outer circumference of the non-bendable straight tube portion 20. Each circumferential movement restricting projecting portion 50 has a function to restrict a circumferential rotation of the fixing member 60 relative to the non-bendable straight tube portion 20 by being fitted between projecting portions 71*c*, 72*c*, which will be described later.

Next, the slidable attaching portion 40 will be described.

The slidable attaching portion 40 has a longitudinal movement permitting projecting portion 41 and the circumferential movement restricting projecting portion 50.

The longitudinal movement permitting projecting portion 41 is provided on the outer circumferential surface 20*a* of the non-bendable straight tube portion 20 along the circumferential direction in such a way as to project therefrom. Additionally, longitudinal movement permitting projecting portions 41 are provided in pair so as to be spaced apart from each other by a distance which enables the fixing member 60 to slide in the longitudinal direction of the non-bendable straight tube portion 20.

More specifically, as shown in FIG. 2, a distance T2 by which the longitudinal movement permitting projecting portions 41 provided in pair are spaced apart from each other is set to be larger than the width T1 of the holding portion 70, which will be described later, of the fixing member 60. The fixing member 60 slides between the longitudinal movement permitting projecting portions 41, and the abutment of the fixing member 60 with the longitudinal movement permitting projecting portions 41 defines a movable range of the fixing member 60.

Additionally, each longitudinal movement permitting projecting portion 41 has the same shape as that of the longitudinal movement restricting projecting portion 31 and is formed into a ring-like shape which extends along the circumferential direction of the non-bendable straight tube portion 20. Namely, a surface which is brought into contact with the fixing member 60 is set as large as possible. This not only enables the longitudinal movement permitting projecting portion 41 to be butted up against the fixing member 60 in an ensured fashion but also enhances the rigidity of the longitudinal movement permitting projecting portion 41 itself.

In the electric wire sheathing protection tube 1 of this embodiment, the plurality of longitudinal movement restricting projecting portions 31 are provided continuously on the bendable straight tube portion 20 along the longitudinal direction thereof in such a way as to be spaced apart from each other by the distance equal to the width of the fixing member 60. This enhances the rigidity of the non-bendable straight tube portion 20 as a hole.

Additionally, the circumferential movement restricting projecting portions 50 are provided so as to stretch for the whole longitudinal area of the non-bendable straight tube portion 20. This enhances the rigidity of the non-bendable straight tube portion 20 as a hole.

Here, the fixing member 60 will be described.

As shown in FIGS. 4A to 5B, the fixing member 60 has a holding portion 70 which fixes the non-bendable straight tube portion 20 by holding the non-bendable straight tube portion 20 and an attaching and fixing portion 80 which is fixed to a predetermined attaching position of the body B.

The holding portion 70 has a movable holding portion 71, a fixed holding portion 72 and a deflection deformable connecting portion 73 which connects the movable holding portion 71 and the fixed holding portion 72 together continuously. When the movable holding portion 71 is folded back on to the fixed holding portion 72 via the connecting portion 73, the non-bendable straight tube portion 20 is held between the movable holding portion 71 and the fixed holding portion 72.

Additionally, an engaging portion 70a which is provided at an opposite end portion of the movable holding portion 71 to an end portion which is contiguous with the connecting portion 73 is brought into engagement with an engaged portion, not shown, which is provided on the fixed holding portion 72, whereby the holding portion 70 is locked in such a state that the holding portion 70 holds the non-bendable straight tube portion 20.

As shown in FIGS. 5A and 5B, the movable holding portion 71 and the fixed holding portion 72 have non-bendable straight tube portion contactable surface portions 71a, 72a which are brought into contact with the outer circumferential surface 20a of the non-bendable straight tube portion 20 which is held by the holding portion 70 in such a state that the movable holding portion 71 and the fixed holding portion 72 are brought into engagement with each other.

The non-bendable straight tube portion contactable surface portions 71a, 72a are formed into a curved surface which corresponds to the shape of the outer circumferential surface 20a of the non-bendable straight tube portion 20. More specifically, the non-bendable straight tube portion contactable surfaces 71a, 72a are formed on upper edge surfaces of projecting portions 71c, 72c which project from non-bendable straight tube portion facing surfaces 71b, 72b which face (confront) the outer circumferential surface 20a of the non-bendable straight tube portion 20.

The projecting portions 71c, 72c are provided in a plurality of locations on the non-bendable straight tube facing surfaces 71b, 72b so as to define therebetween spaces A equal to a width of the circumferential movement restricting projecting portion 50 so that the circumferential movement restricting projecting portions 50 on the non-bendable straight tube portion 20 can be fitted in the spaces A.

While the embodiment is described as the projecting portions 71c, 72c being provided on the fixing member 60, the invention is not limited thereto. Therefore, a configuration may be adopted in which the projecting portions 71c, 72c are not provided and in place of the projecting portions 71c, 72c, the non-bendable straight tube portion facing surfaces 71b, 72b are brought into direct contact with the outer circumferential surface 20a of the non-bendable straight tube portion 20 with the circumferential movement restricting projecting portions 50 fitted in grooves formed on the non-bendable straight tube portion facing surfaces 71b, 72b.

The attaching and fixing portion 80 has a bolt passage hole 81 through which a stud bolt, not shown, which is provided in the predetermined fixing position on the body B so as to project therefrom is passed. The fixing member 60 is fixed to the predetermined position by passing the stud bolt, not shown, through the bolt passage hole 81. The attaching and fixing portion 80 may have a different construction having no bolt passage hole 81 as long as the attaching and fixing portion 80 is constructed to be fixed to the predetermined position.

The width of the holding portion 70 of the fixing member 60 is equal to the distance by which the longitudinal movement restricting projecting portions 31 which are provided in pair on the fixed attaching portion 30 are spaced apart from each other. Because of this, the fixing member 60 is fixedly attached to the non-bendable straight tube portion 20 by the holding portion 70 being disposed between the longitudinal movement restricting projecting portions 31 which are provided in pair on the fixed attaching portion 30. Namely, the fixing member 60 is fixed to the non-bendable straight tube portion 20.

In addition, by the holding portion 70 being disposed between the longitudinal movement permitting projecting portions 41 which are provided in pair on the slidable attaching portion 40, the fixing member 60 is attached to the non-bendable straight tube portion 20 so as to freely slide between the longitudinal movement permitting projecting portions 41 which are set to be spaced apart from each other by the distance which is larger than the width of the holding portion 70.

Additionally, the fixing member 60 is attached to the non-bendable straight tube portion 20 in such a state that the fixing member 60 is restricted from rotating in the circumferential direction of the non-bendable straight tube portion 20 by the circumferential movement restricting projecting portions 50 being fitted in the spaces A defined between the projecting portions 71c, 72c.

Figure 7A:
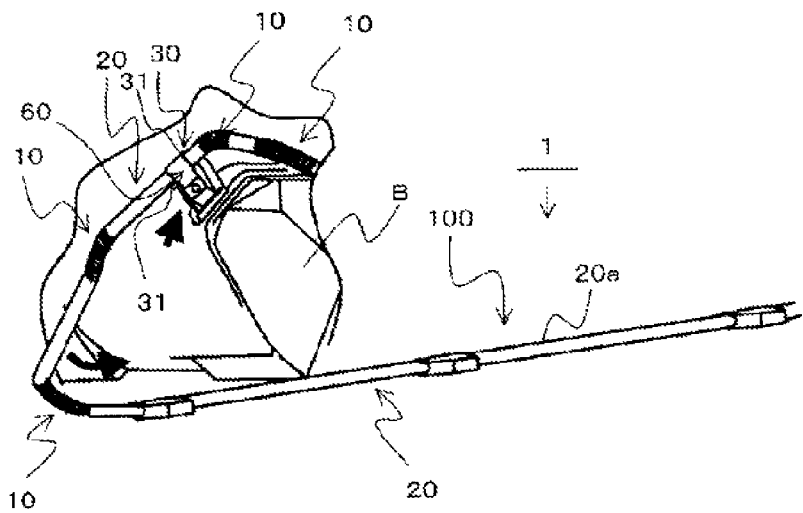
FIGS. 7A to 7C are views showing an example of a routing procedure of the wire harness using the electric wire sheathing protection tube.
Figure 7B:
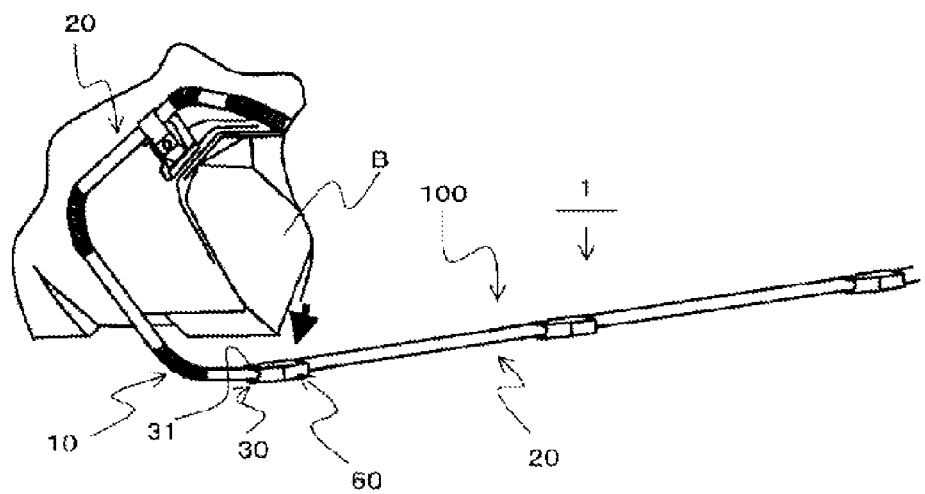
Figure 7C:
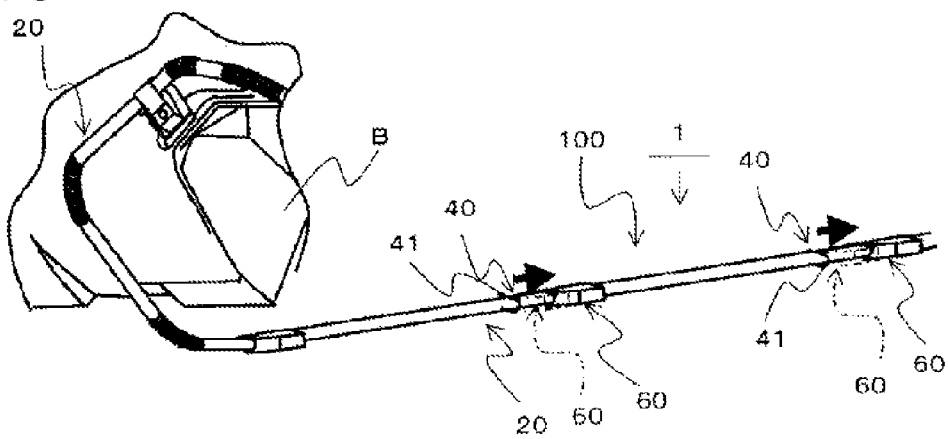

Next, an example of a routing procedure of the wire harness 100 which uses the electric wire sheathing protection tube 1 will be described by using FIGS. 7A to 7C. FIGS. 7A to 7C are views showing an example of a routing procedure of the wire harness 100 which uses the electric wire sheathing protection tube 1.

As a preparation for routing work which will be described here, four fixing members 60 are attached to the non-bendable straight tube portions 20. In this embodiment, the fixing members 60 are attached to the non-bendable straight tube portions 20 which are provided in the two sections in the non-bendable straight tube portions 20 which are provided in the four sections. In particular, the long non-bendable straight tube portion 20 which is disposed under the floor of the motor vehicle is fixed to the predetermined attaching positions on the body B by the three fixing members 60.

More specifically, on the long non-bendable straight tube portion 20, one of the three fixing members 60 is attached to a fixed attaching portion 30 which is provided near the bendable portion 10, and the remaining two fixing members 60 are attached to the slidable attaching portions 40 which are provided in the two locations. On the other hand, on the remaining one non-bendable straight tube portion 20, the remaining one fixing member 60 is attached to a fixed attaching portion 30 which is provided near the bendable portion 10.

After the preparatory work is performed as described above, firstly, a working person fixes the first fixing member 60 which is attached to the fixed attaching portion 30 to the predetermined position on the body B (refer to FIG. 7A). Since no fixing member 60 is fixed to any of the predetermined attaching positions before this work, in this attaching work, the fixing member 60 can be fixed to the predetermined position irrespective of a tolerance in dimension.

Thereafter, the working person bends the electric wire sheathing protection tube 1 which is fixed at one location by the fixing member 60 so as to follow the routing line and then fixes the second fixing member 60 which is attached to the different fixed attaching portion 30 to another predetermined position (refer to FIG. 7B). In this work, the fixing member 60 is fixed to the predetermined position while adjusting the position thereof by bending the bendable portion 10 which is present between the fixing member 60 which is fixed first and the second fixing member.

Finally, the working person completes the routing work by fixing individually the remaining two fixing members 60 which are attached to the slidable attaching portions 40 to the corresponding predetermined attaching position (refer to FIG. 7C). When these two fixing members 60 are fixed to the corresponding predetermined positions, since the non-bendable straight tube portion 20 has already been fixed at one location by the fixing member 60, the fixing members 60 are slidably moved to be aligned with the respective attaching positions in such a way as to absorb the dimensional tolerances of the electric wire sheathing protection tube 1 in fabrication and the attaching positions of the electric wire sheathing protection tube 1.

According to the electric wire sheathing protection tube 1 according to the embodiment, even in the event that the non-bendable straight tube portion 20 in one section is fixed at the plurality of locations by the fixing members 60, after the fixing member 60 which is attached to the fixed attaching portion 30 is fixed to the predetermined position, the fixing members 60 which are attached to the slidable attaching portions 40 slide to the predetermined positions to fix them thereto, whereby the electric wire sheathing protection tube 1 can be routed while absorbing the dimensional tolerances of the electric wire sheathing protection tube 1 in fabrication and the attaching positions of the electric wire sheathing protection tube 1, thereby making it possible to improve the efficiency of the routing work.

In the embodiment, while the fixing members 60 are fixed individually to the fixed attaching portions 30 of the non-bendable straight tube portions 20 in the two sections, understanding that the second fixing member 60 is not originally provided to fix the non-bendable straight tube portion 20, the fixing of the electric wire sheathing protection tube 1 may be dealt with by only the first fixing member 60.

According to the electric wire sheathing protection tube 1 according to the embodiment, the attaching locations where the fixing members 60 are attached to the electric wire sheathing protection tube 1 can easily be identified by the longitudinal movement restricting projecting portions 31 which are provided in pair and the longitudinal movement permitting projecting portions 41 which are provided in pair.

According to the electric wire sheathing protection tube 1 according to the embodiment, the portions whose thickness is increased by the longitudinal movement restricting projecting portion 31 are provided continuously along the longitudinal direction of the non-bendable straight tube portion 20, whereby it is possible to enhance the rigidity of the non-bendable straight tube portion 20.

According to the electric wire sheathing protection tube 1 according to the embodiment, the fixing member 60 can be prevented from rotating in the circumferential direction of the non-bendable straight tube portion 20 by the circumferential movement restricting projecting portions 50, and therefore, not only can the looseness of the fixing member 60 relative to the non-bendable straight tube portion 20 be restricted, but also the circumferential movement restricting projecting portions 50 can constitute a reference for positioning the fixing member 60 when the fixing member 60 is attached to the non-bendable straight tube portion 20.

According to the electric wire sheathing protection tube 1 according to the embodiment, when the plurality of fixing members 60 are attached to the non-bendable straight tube portion 20 in one section, since the slidable attaching portions 40 are inevitably provided in the section, it is possible to route the electric wire sheathing protection tube 1 by absorbing the dimensional tolerances of the electric wire sheathing protection tube 1 in fabrication and the attaching positions of the electric wire sheathing protection tube 1 in an ensured fashion.

Modified Example 1

Figure 8:
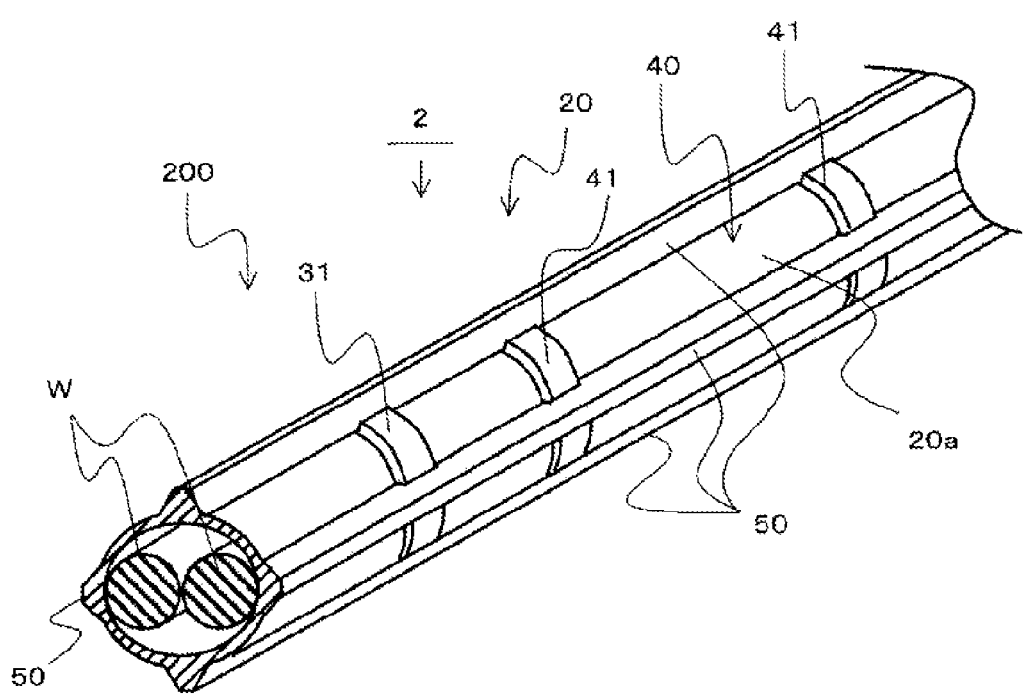
FIG. 8 is a perspective view showing part of a wire harness using an electric wire sheathing protection tube of a modified example 1 and a section thereof.

Next, referring to FIG. 8, a modified example 1 of the electric wire sheathing protection tube 1 according to the embodiment will be described. FIG. 8 is a perspective view showing part of a wire harness 200 using an electric wire sheathing protection tube 2 of the modified example 1 and a section thereof.

The electric wire sheathing protection tube 2 of the modified example 1 differs from the electric wire sheathing protection tube 1 of the embodiment above in that a sectional outline is of a circular shape.

The other configurations and a mode in which the electric wire sheathing protection tube 2 is used are the same as those of the electric wire sheathing protection tube 1 of the embodiment above, and like reference numerals will be given to like portions to those of the electric wire sheathing protection tube 1.

This electric wire sheathing protection tube 2 is fixed to predetermined attaching positions by fixing members, not shown, which are adapted to the electric wire sheathing protection tube 2 whose sectional outline is circular, in place of the fixing members 60. The fixing members, not shown, are configured in the same way as the fixing members 60, excluding the fact that the fixing members are set to have a shape corresponding to that of the electric wire sheathing protection tube 2, and therefore, the description thereof will be omitted here.

The electric wire sheathing protection tube 2 of this modified example 1 provides the same advantage as that provided by the electric wire sheathing protection tube 1 of the embodiment described above. Additionally, since the sectional outline is circular, although the fixing members, not shown, become easier to be rotated in a circumferential direction of the electric wire sheathing protection tube 2, the circumferential movement restricting projecting portions 50 exhibit their rotation preventing functions more effectively.

Modified Example 2

Figure 9:
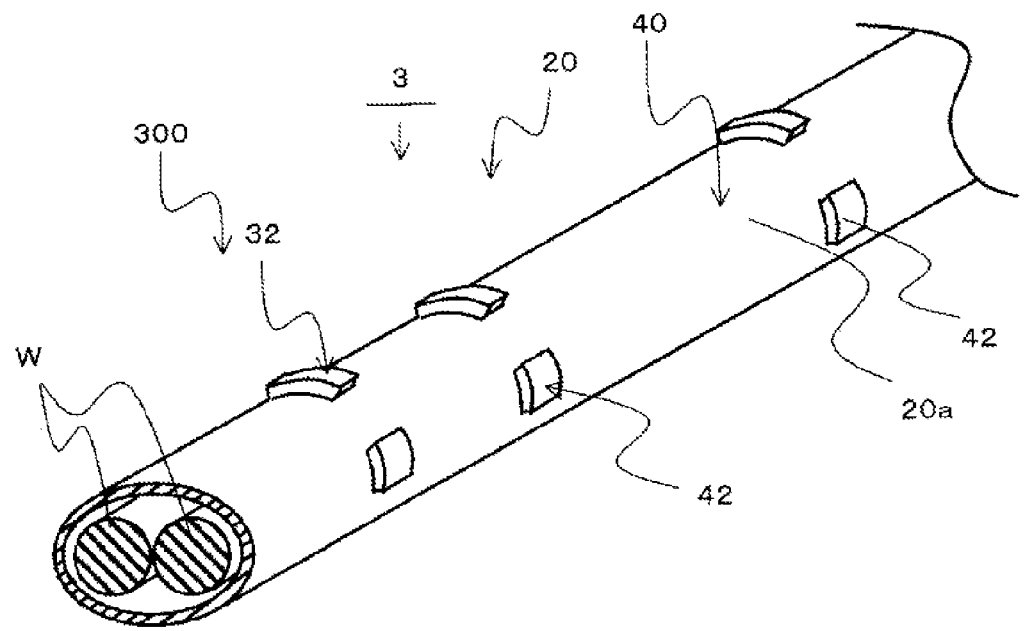
FIG. 9 is a perspective view showing part of a wire harness using an electric wire sheathing protection tube of a modified example 2 and a section thereof.

Next, referring to FIG. 9, a modified example 2 of the electric wire sheathing protection tube 1 according to the embodiment will be described. FIG. 9 is a perspective view showing part of a wire harness 300 using an electric wire sheathing protection tube 3 of the modified example 2 and a section thereof.

The electric wire sheathing protection tube 3 of the modified example 2 differs from the electric wire sheathing protection tube 1 of the embodiment above in that a longitudinal movement restricting projecting portion 32 and longitudinal movement permitting projecting portions 42 are formed partially along a circumferential direction of a non-bendable straight tube portion 20 and in that no circumferential movement restricting projecting portion 50 is provided.

The other configurations and a mode in which the electric wire sheathing protection tube 3 is used are the same as those of the electric wire sheathing protection tube 1 of the embodiment above, and like reference numerals will be given to like portions to those of the electric wire sheathing protection tube 1.

According to the electric wire sheathing protection tube 3 of the modified example 2, as with the electric wire sheathing protection tube 1 of the embodiment described above, the electric wire sheathing protection tube 3 can be routed while absorbing the dimensional tolerances of the electric wire sheathing protection tube 3 in fabrication and the attaching positions of the electric wire sheathing protection tube 3, and therefore, the efficiency of the routing work can be enhanced.

The electric wire sheathing protection tube 3 of this modified example 2 has an elliptic sectional outline, which is similar to the electric wire sheathing protection tube 1 of the embodiment described above, and therefore, although no circumferential movement restricting projecting portion 50 is provided, it will be difficult for fixing members 60 to be rotated in a circumferential direction of the electric wire sheathing protection tube 3.

Modified Example 3

Figure 10:
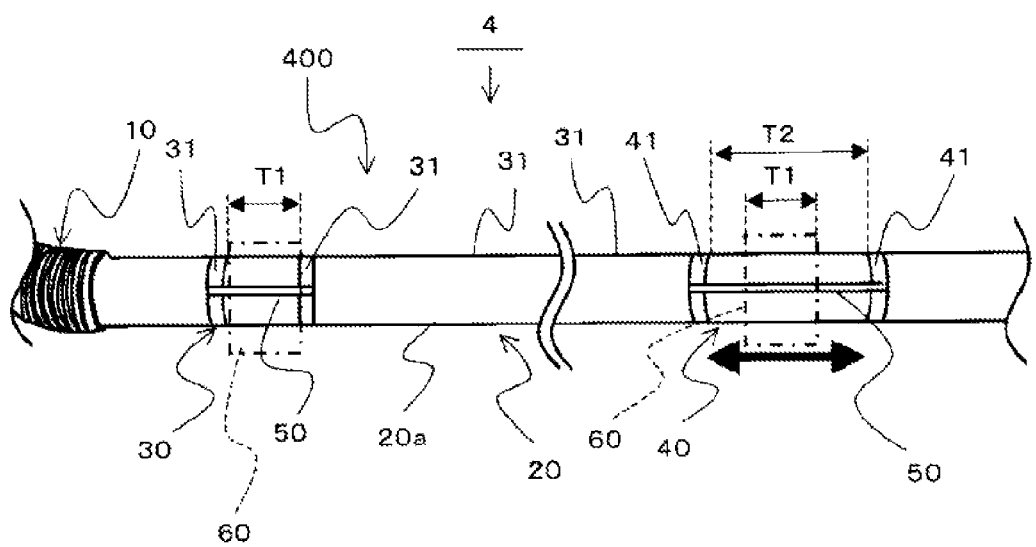
FIG. 10 is a perspective view showing part of a wire harness using an electric wire sheathing protection tube of a modified example 3 and a section thereof.

Next, referring to FIG. 10, a modified example 3 of the electric wire sheathing protection tube 1 according to the embodiment described above will be described. FIG. 10 is an enlarged view of a main part of an electric wire sheathing protection tube 4 of the modified example 3.

The electric wire sheathing protection tube 4 of the modified example 3 differs from the electric wire sheathing protection tube 1 of the embodiment described above in that longitudinal movement restricting projecting portions 31 are not provided continuously along a longitudinal direction of a non-bendable straight tube portion 20 but a longitudinal movement restricting projecting portion 31 is provided only on a fixed attaching portion 30 and in that circumferential movement permitting projecting portions 50 are provided only on the fixed attaching portion 30 and a slidable attaching portion 40.

The other configurations and a mode in which the electric wire sheathing protection tube 4 is used are the same as those of the electric wire sheathing protection tube 1 of the embodiment above, and like reference numerals will be given to like portions to those of the electric wire sheathing protection tube 1.

According to the electric wire sheathing protection tube 4 of the modified example 3, as with the electric wire sheathing protection tube 1 of the embodiment described above, the electric wire sheathing protection tube 4 can be routed while absorbing the dimensional tolerances of the electric wire sheathing protection tube 4 in fabrication and the attaching positions of the electric wire sheathing protection tube 4, and therefore, not only can the efficiency of the routing work be enhanced, but also the attaching positions of fixing members 60 to the electric wire sheathing protection tube 4 can be identified more easily.

Although the electric wire sheathing protection tube 1, 2, 3, 4 according to the embodiment is described as having the bendable portions 10 which are provided in the four sections and the non-bendable straight tube portions 20 which are provided in the four sections, the number of sections where the bendable portions 10 and the non-bendable straight tube portions 20 are provided is not limited thereto. Namely, the electric wire sheathing protection tube 1, 2, 3, 4 should include at least one section where one bendable portion 10 is provided and one section where one non-bendable straight tube portion 20 is provided.

Additionally, although the electric wire sheathing protection tube 1, 2, 3, 4 according to the embodiment is described as having the fixed attaching portions 30 and the slidable attaching portions 40 which correspond to the four fixing members 60, the number of fixing members 60 is not limited thereto, and hence, the fixed attaching portions 30 and slidable attaching portions 40 should be provided according to the number of fixing members 60 provided.

The technical scope of the invention should not be limited by the embodiment described above. The embodiment can accompanied by various modifications and/or improvements made within the technical scope of the invention.

Hereinafter, the electric wire sheathing protection tubes 1, 2, 3, 4 according to the embodiment will be summarized.

(1) The electric wire sheathing protection tube 1, 2, 3, 4 is formed from an insulation resin into the tubular shape, accommodates the electric wires W in the interior thereof and is fixed to the predetermined positions by the fixing members 60. In the electric wire sheathing protection tube 1, 2, 3, 4, the bendable portions 10 which constitute the bendable sections and the non-bendable straight tube portions 20 which constitute the sections which are held into the straight tube shape are provided continuously and alternately along the longitudinal direction of the electric wire sheathing protection tube 1, 2, 3, 4. The fixed attaching portion 30 to which the fixing member 60 is fixedly attached is provided integrally on at least one section in the non-bendable straight tube portions 20. The slidable attaching member 40 to which the fixing member 60 is attached slidably in the longitudinal direction is provided integrally on at least one section in the non-bendable straight tube portions 20.

(2) The fixed attaching portion 30 has longitudinal movement restricting projecting portions 31 (32) which are provided on the outer circumferential surface 20a of the non-bendable straight tube portion 20 so as to project therefrom while extending in the circumferential direction thereof, and the longitudinal movement restricting projecting portions 31 (32) are provided in pair so as to be spaced apart from each other in the longitudinal direction by the distance which is equal to the width of the fixing member 60 so that the fixing member 60 is disposed between the longitudinal movement restricting projecting portions 31 (32). The slidable attaching portions 40 have the longitudinal movement permitting projecting portions 41 (42) which are provided on the outer circumferential surface 20a of the non-bendable straight tube portion 20 so as to project therefrom while extending in the circumferential direction thereof, and the longitudinal movement permitting projecting portions 41 (42) are provided in pair so as to be spaced apart from each other by the distance over which the fixing member 60 can slide in the longitudinal direction.

(3) The plurality of longitudinal movement restricting projecting portions 31 (32) are provided along the longitudinal direction so as to be spaced apart from each other by the distance which is equal to the width of the fixing member 60.

(4) The fixed attaching portion 30 and the slidable attaching portion 40 have the circumferential movement restricting projecting portion 50 which is provided on the outer circumferential surface 20a of the non-bendable straight tube portion 20 and projects therefrom while extending straight along the longitudinal direction so as to restrict the circumferential movement of the fixing member 60 relative to the non-bendable straight tube portion 20.

(5) At least one slidable attaching portion 40 is provided on the non-bendable straight tube portion 20 on which the plurality of fixing members 60 are provided in the non-bendable straight tube portions 20.

The electric wire sheathing protection tube according to the invention is useful in providing the electric wire sheathing protection tube which can improve the efficiency of the routing work.

What is claimed is:

1. An electric wire sheathing protection tube which is formed from an insulation resin into a tubular shape, which accommodates an electric wire in an interior thereof and which is fixed to a predetermined position by a fixing member, wherein
   bendable portions which constitute bendable sections and non-bendable straight tube portions which constitute sections which are held into a straight tube shape are provided continuously and alternately along a longitudinal direction of the electric wire sheathing protection tube,
   a fixed attaching portion to which the fixing member is fixedly attached is provided integrally on at least one section in the non-bendable straight tube portions, and
   a slidable attaching portion to which the fixing member is attached so as to slide in the longitudinal direction is provided integrally on at least one section in the non-bendable straight tube portions.

2. The electric wire sheathing protection tube according to claim 1, wherein:
   the fixed attaching portion has longitudinal movement restricting projecting portions which are provided on an outer circumferential surface of the non-bendable straight tube portion so as to project therefrom while extending in a circumferential direction of the non-bendable straight tube portion, and the longitudinal movement restricting projecting portions are provided in pair so as to be spaced apart from each other in the longitudinal direction by a distance which is equal to a width of the fixing member so that the fixing member is disposed between the longitudinal movement restricting projecting portions, and
   the slidable attaching portions have longitudinal movement permitting projecting portions which are provided on the outer circumferential surface of the non-bendable straight tube portion so as to project therefrom while extending in the circumferential direction, and the longitudinal movement permitting projecting portions are provided in pair so as to be spaced apart from each other by a distance over which the fixing member can slide in the longitudinal direction.

3. The electric wire sheathing protection tube according to claim 2, wherein
   a plurality of longitudinal movement restricting projecting portions like the longitudinal movement restricting projecting portion are provided along the longitudinal direction so as to be spaced apart from each other by a distance which is equal to a width of the fixing member.

4. The electric wire sheathing protection tube according to claim 2, wherein
   the fixed attaching portion and the slidable attaching portion have a circumferential movement restricting projecting portion which is provided on the outer circumferential surface of the non-bendable straight tube portion and projects therefrom while extending straight along the longitudinal direction so as to restrict a circumferential movement of the fixing member relative to the non-bendable straight tube portion.

5. The electric wire sheathing protection tube according to claim 1, wherein
   at least one slidable attaching portion is provided on the non-bendable straight tube portion on which a plurality of the fixing members are provided in the non-bendable straight tube portions.

* * * * *